US012355178B2

(12) United States Patent
Ito et al.

(10) Patent No.: US 12,355,178 B2
(45) Date of Patent: Jul. 8, 2025

(54) CONNECTOR CAPABLE OF SUPPRESSING SEPARATION OF LID FROM HOUSING

(71) Applicant: SUMITOMO WIRING SYSTEMS, LTD., Mie (JP)

(72) Inventors: Yusuke Ito, Mie (JP); Tomoaki Yasuda, Mie (JP); Shohei Mitsui, Mie (JP); Wataru Yamanaka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 362 days.

(21) Appl. No.: 17/989,132

(22) Filed: Nov. 17, 2022

(65) Prior Publication Data

US 2023/0163510 A1 May 25, 2023

(30) Foreign Application Priority Data

Nov. 24, 2021 (JP) ................................ 2021-190342

(51) Int. Cl.

*H01R 13/42* (2006.01)
*H01R 13/506* (2006.01)
*H01R 13/6592* (2011.01)
*H01R 24/40* (2011.01)

(52) U.S. Cl.

CPC ........... *H01R 13/42* (2013.01); *H01R 13/506* (2013.01); *H01R 13/6592* (2013.01); *H01R 24/40* (2013.01)

(58) Field of Classification Search

None

See application file for complete search history.

(56) References Cited

U.S. PATENT DOCUMENTS 5,120,246 A * 6/1992 Knox .................. H01R 4/2433 439/417
5,336,114 A * 8/1994 Wang ..................... H01R 24/20 439/598
8,512,069 B2 * 8/2013 Kao ..................... H01R 13/506 439/106
2023/0163514 A1 * 5/2023 Ito ...................... H01R 13/5227 439/271

FOREIGN PATENT DOCUMENTS

JP 2014-107139 A 6/2014

* cited by examiner

*Primary Examiner* — Oscar C Jimenez
(74) *Attorney, Agent, or Firm* — Venjuris, P.C.

(57) ABSTRACT

A connector includes small-diameter shielded terminals 51 that are connected to small-diameter shielded electric wires 61, and a housing 10 that includes wide terminal housing parts 73 and a narrow terminal housing part 74. The wide terminal housing parts 73 include wide holding parts 35 and a lid part 41. The narrow terminal housing part 74 includes a narrow holding part 36 and the lid part 41. The lid part 41 includes a plate-like covering part 42 that covers openings in the wide holding parts 35 and the narrow holding part 36, and elastic pressure-receiving parts 43 that protrude from the plate-like covering part 42 into the wide terminal housing parts 73 and the narrow terminal housing part 74 and are elastically deformable under pressing forces of the small-diameter shielded electric wires 61 or the coated electric wire 67.

11 Claims, 9 Drawing Sheets

CONNECTOR CAPABLE OF SUPPRESSING SEPARATION OF LID FROM HOUSING

CROSS-REFERENCE TO RELATED APPLICATIONS

This application is based on and claims priority from Japanese Patent Application No. 2021-190342, filed on Nov. 24, 2021, with the Japan Patent Office, the disclosure of which is incorporated herein in its entirety by reference.

TECHNICAL FIELD

The present disclosure relates to a connector.

BACKGROUND

JP 2014-107139A discloses a connector that includes a partition wall member having a groove-like partition wall-side concave storage part, a cover that closes an opening of the partition wall-side concave storage part, and a connection terminal. With the connection terminal housed in the partition wall-side concave storage part, a coaxial cable connected to the connection terminal is drawn out rearward to the outside of the connector.

SUMMARY

The foregoing connector has a problem where a bending force acts on the portion of the coaxial cable drawn out rearward of the connector, and when the coaxial cable presses the cover, the cover may come loose.

A connector of the present disclosure is completed in view of the circumstances described above, and an object of the present disclosure is to prevent separation of the cover caused by the pressing force of an electric wire.

A connector of the present disclosure includes:

a terminal metal fitting that is connected to a front end portion of an electric wire; and a housing including a terminal housing part, wherein, in a state where the terminal metal fitting and the front end portion of the electric wire are housed in the terminal housing part, the electric wire is drawn out from a rear surface of the housing to the outside of the housing, the terminal housing part includes:

a holding part with a U-shaped cross section; and a lid part that is formed of a member separate from the holding part, and the lid part includes:

a plate-like covering part that covers an opening in the holding part; and an elastic pressure-receiving part that protrudes from the plate-like covering part into the terminal housing part and is elastically deformable under a pressing force of the electric wire.

According to the present disclosure, it is possible to suppress concentration of stress caused by the pressing force of the electric wire.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
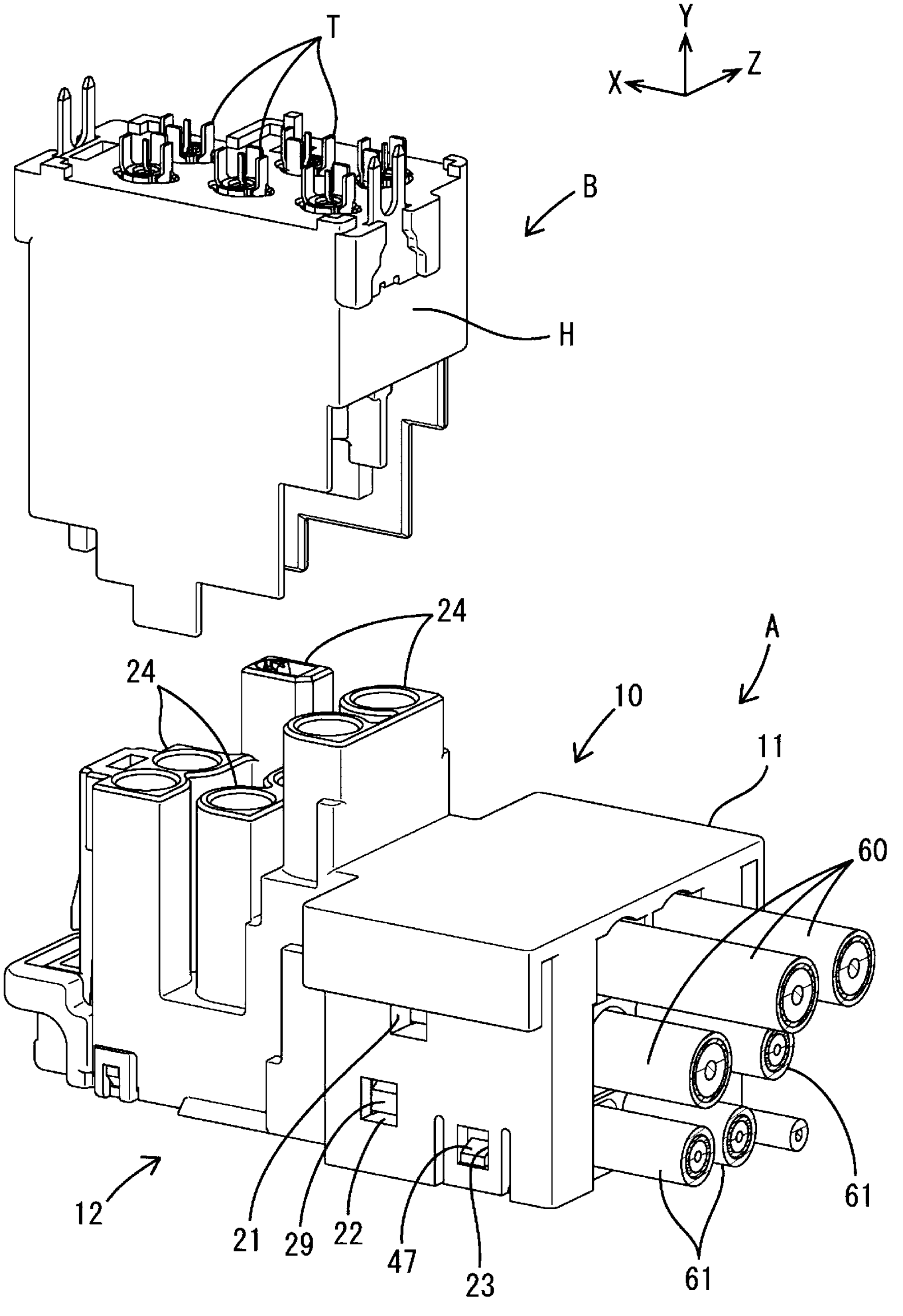
FIG. 1 is a perspective view showing a state where a connector of a first example and a counterpart connector are separated from each other.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

First, embodiments of the present disclosure will be listed and described.

(1) A connector of the present disclosure is a connector that includes: a terminal metal fitting that is connected to a front end portion of an electric wire; and a housing including a terminal housing part, wherein, in a state where the terminal metal fitting and the front end portion of the electric wire are housed in the terminal housing part, the electric wire is drawn out from a rear surface of the housing to the outside of the housing, the terminal housing part includes: a holding part with a U-shaped cross section; and a lid part that is formed of a member separate from the holding part, and the lid part includes: a plate-like covering part that covers an opening in the holding part; and an elastic pressure-receiving part that protrudes from the plate-like covering part into the terminal housing part and is elastically deformable under a pressing force of the electric wire. According to the configuration of the present disclosure, when the electric wire in the holding part is displaced toward the lid part, the elastic pressure-receiving part elastically deforms under the pressing force of the electric wire, so that the stress exerted on the lid part is distributed between the plate-like covering part and the elastic pressure-receiving part. If the amount of deformation of the lid part becomes increases, there is a concern that the lid part will separate from the holding part. In view of this point, the stress exerted on the lid part is distributed to suppress the maximum amount of deformation of the lid part, and thus the lid part is kept in a state of being attached to the holding part. According to the present disclosure, it is possible to prevent the cover from separating from the holding part due to the pressing force of the electric wire acting on the lid part.

(2) It is preferable that the holding part includes: a base part that opposes the plate-like covering part; and a pair of side wall parts that extend from two side edges of the base part toward the plate-like covering part, a plurality of the elastic pressure-receiving parts are respectively arranged along the side wall parts, and when the elastic pressure-receiving parts are elastically deformed under the pressing force of the electric wire, the elastic pressure-receiving parts are pressed against the side wall parts. According to this configuration, when the pressing force of the electric wire acts on the elastic pressure-receiving part, the lid part is pressed in a direction away from the base part. However, the friction resistance generated between the elastic pressure-receiving part and the side wall parts prevents the lid part from being displaced in the direction away from the base part.

(3) In (2), it is preferable that an area of each of the elastic pressure-receiving parts that comes in contact with the electric wire is formed by an inclined surface that is inclined with respect to a direction that is orthogonal to the plate-like covering part. According to this configuration, when the electric wire is displaced in the direction orthogonal to the plate-like covering part and presses the inclined surfaces, a portion of the pressing force of the electric wire acting on the elastic pressure-receiving parts becomes a component force in a direction toward the side wall parts due to the inclination of the inclined surfaces. As the amount of displacement of the electric wire increases, the amount of elastic deformation of the elastic pressure-receiving parts also increases. However, once the amount of elastic deformation of the elastic pressure-receiving parts has increased up to a specific degree, the elastic pressure-receiving parts abut against the side wall parts, and thus the amount of elastic deformation of the elastic pressure-receiving parts no longer increases. Accordingly, it is possible to suppress the stress exerted on the elastic pressure-receiving part.

(4) In (2) or (3), it is preferable that, in a state where the elastic pressure-receiving parts are pressed against the side wall parts, the electric wire is kept in a state of non-contact with the plate-like covering part. According to this configuration, since the pressing force of the electric wire does not directly act on the plate-like covering part, the stress exerted on the plate-like covering part is reduced and the amount of elastic deformation of the plate-like covering part is suppressed. Since the deformation of the plate-like covering part is suppressed, the lid part is unlikely to come loose.

(5) It is preferable that, in a rear view of the housing as seen from a rear side, the elastic pressure-receiving part has a wedge shape that is tapered toward a leading end thereof in a direction of protrusion from the plate-like covering part. According to this configuration, of the stress exerted on the elastic pressure-receiving parts by the action of the pressing force of the electric wire, the component force in the direction orthogonal to the protruding direction of the elastic pressure-receiving parts near a point of contact with the electric wire is smaller on the base end side in the protruding direction connected to the plate-like covering part than on the leading end side in the protruding direction. Therefore, the component force generated on the plate-like covering part connected to the base end portion of the elastic pressure-receiving part in the protruding direction can also be suppressed to a small level, and thus it is possible to prevent the lid part from coming loose due to deformation of the plate-like covering part.

(6) It is preferable that, in a rear view of the housing as seen from a rear side, a pair of the elastic pressure-receiving parts are provided so as to be symmetrical with respect to a virtual axis of symmetry that is orthogonal to the plate-like covering part. In the course of displacement of the electric wire in a direction toward the plate-like covering part, if the path of displacement of the electric wire shifts to one elastic pressure-receiving part or the electric wire becomes twisted, there is a concern that the load on the connection portion with the terminal metal fitting will increase. As a measure against this, the pair of elastic pressure-receiving parts are provided so as to be symmetrical with respect to the virtual axis of symmetry, so that the electric wire does not approach one elastic pressure-receiving part or become twisted. Accordingly, it is possible to suppress generation of a load on connection portion between the terminal metal fitting and the electric wire.

DETAILS OF EMBODIMENTS OF PRESENT DISCLOSURE

First Example

A first example embodying the present disclosure will be described with reference to FIGS. 1 to 9. It should be noted that the present invention is not limited to the examples herein, but rather is indicated by the scope of claims, and is intended to include all modifications within a meaning and scope equivalent to the scope of claims. In the first example, regarding the front-back direction, the normal direction of an X axis in FIGS. 1 to 4 is defined as the forward direction. Regarding the horizontal direction, the normal direction of a Y axis in FIGS. 1 to 3 and 5 to 9 is defined as the rightward direction. The horizontal direction and the width direction are used synonymously. Regarding the vertical direction, the normal direction of a Z axis in FIGS. 1 to 9 is defined as the upward direction. The vertical direction and the height direction are used synonymously.

A connector A of the first example has a shielding function and is fitted to a counterpart connector B (see FIG. 1) mounted to the lower surface of a circuit board (not shown), from below. The counterpart connector B has a shielding function and includes a counterpart housing H and a plurality of counterpart shielded terminals T.

Figure 2:
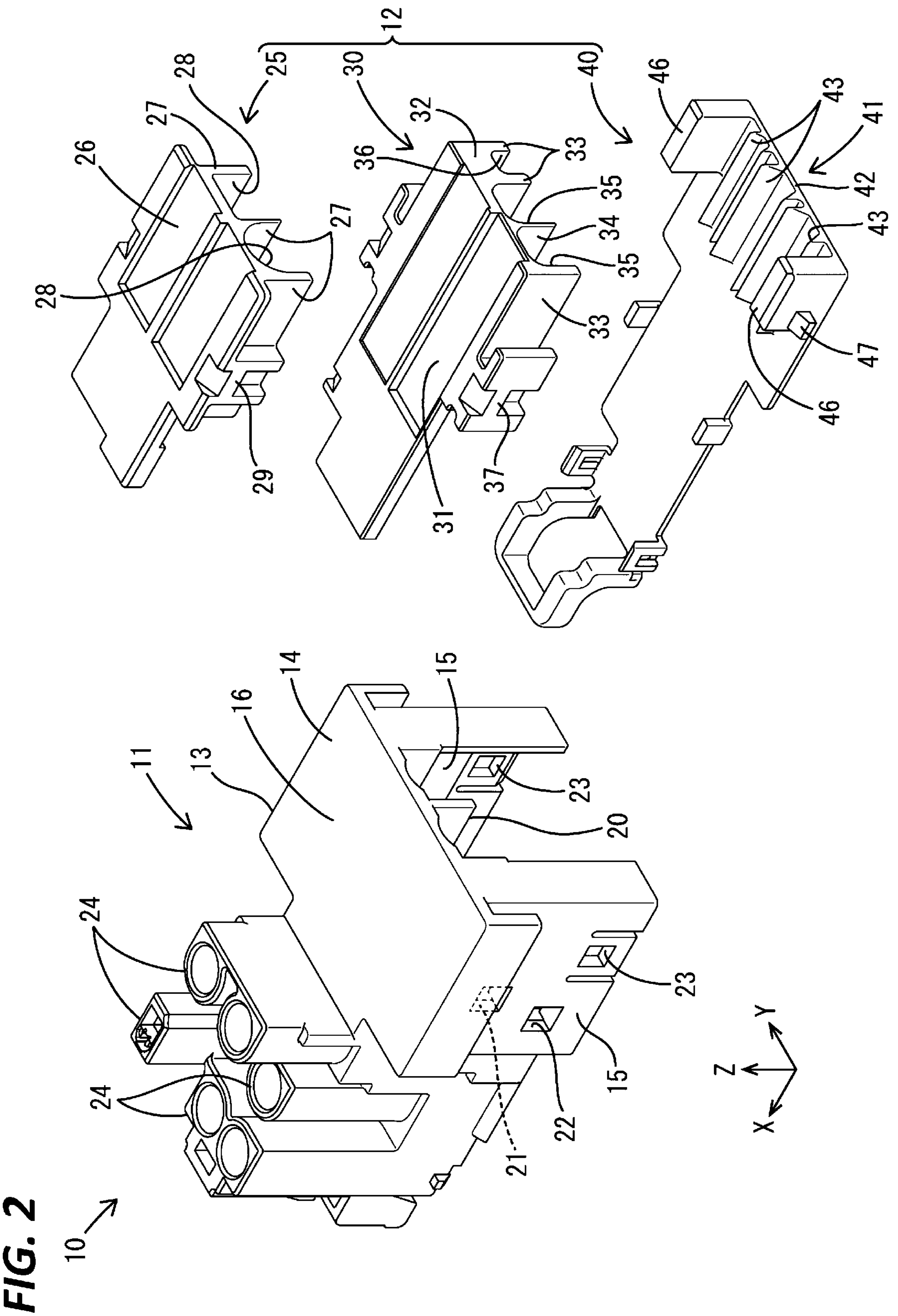
FIG. 2 is an exploded perspective view of a housing.
Figure 3:
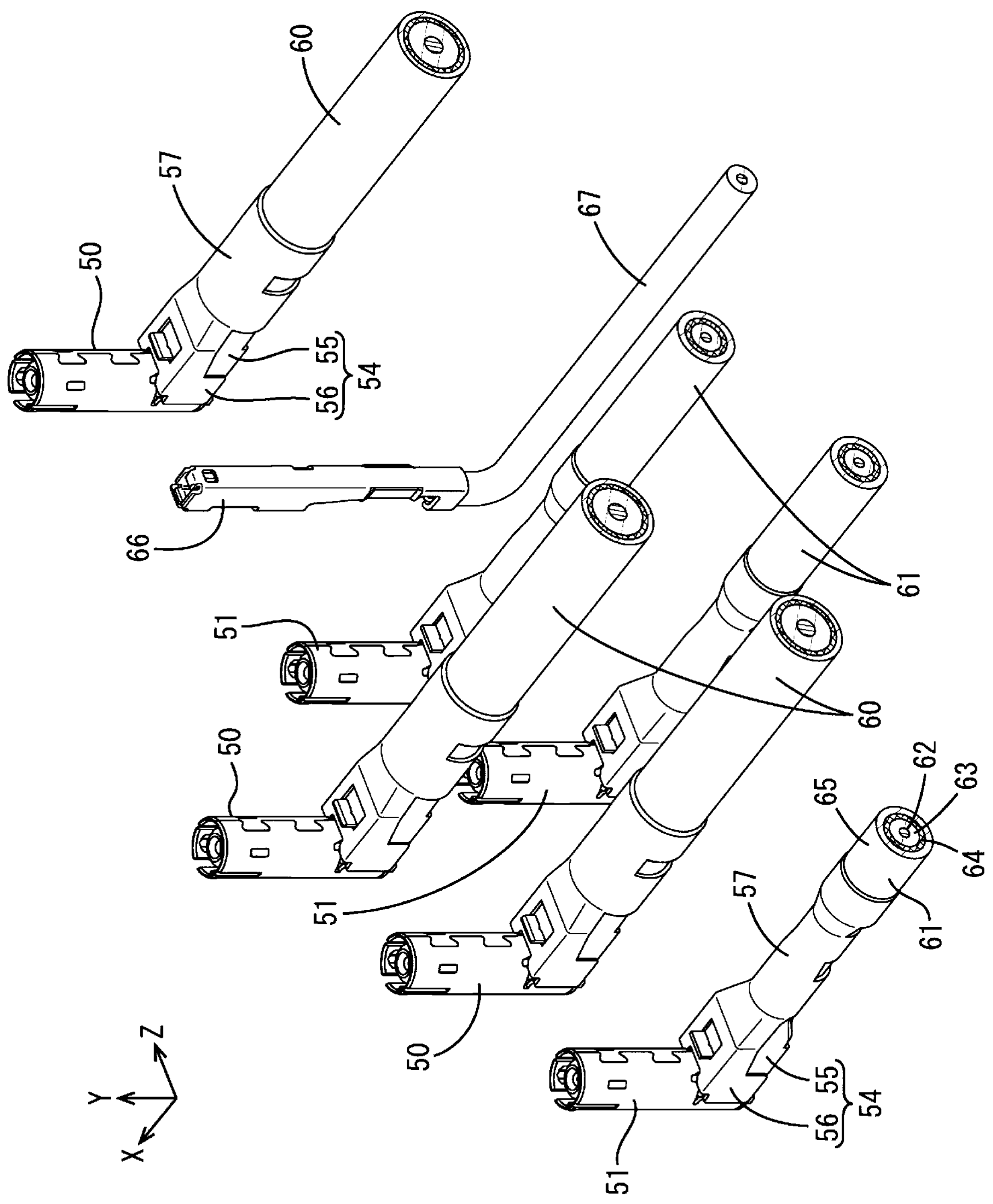
FIG. 3 is a perspective view of large-diameter shielded terminals, small-diameter shielded terminals, and an unshielded terminal.

The connector A is formed by assembling one housing 10 (see FIGS. 1 and 2), a plurality (six in the first example) of shielded terminals 50 and 51 (see FIG. 3), and one unshielded terminal 66 (see FIG. 3). The housing 10 is formed by attaching an outer housing 11 made of a synthetic resin and an inter housing 12 to one another. As shown in FIG. 2, the outer housing 11 is a single component that has a frame part 13 and a plurality of tubular fitting parts 24 arranged adjacent to the front side of the frame part 13. The frame part 13 has a horizontal upper wall part 14 of which the thickness direction is oriented in the vertical direction and a pair of outer wall parts 15 that extend downward from left and right side edges of the upper wall part 14.

Figure 5:
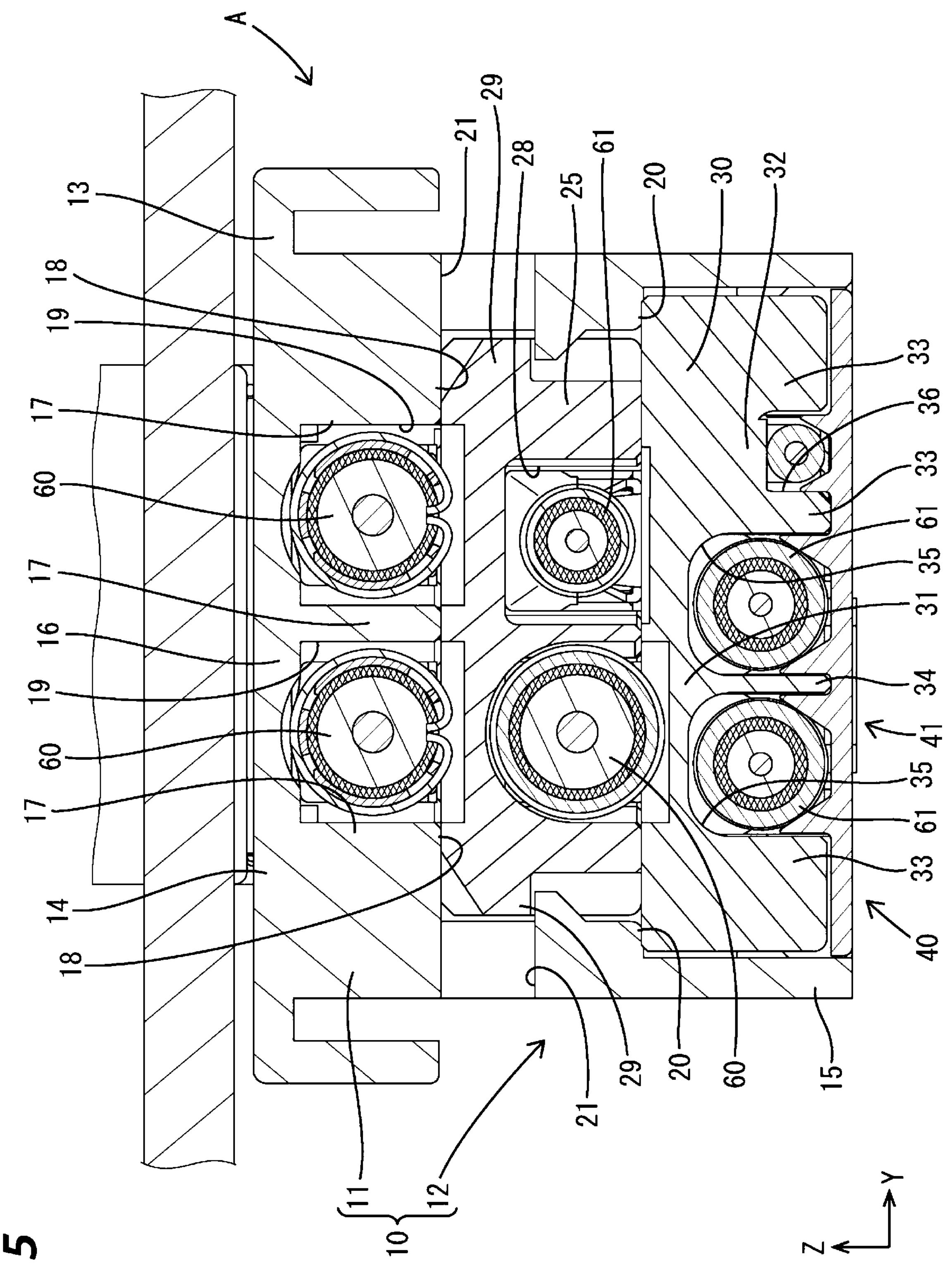
FIG. 5 is a rear cross-sectional view of an engagement structure between an upper member and an outer housing.
Figure 6:
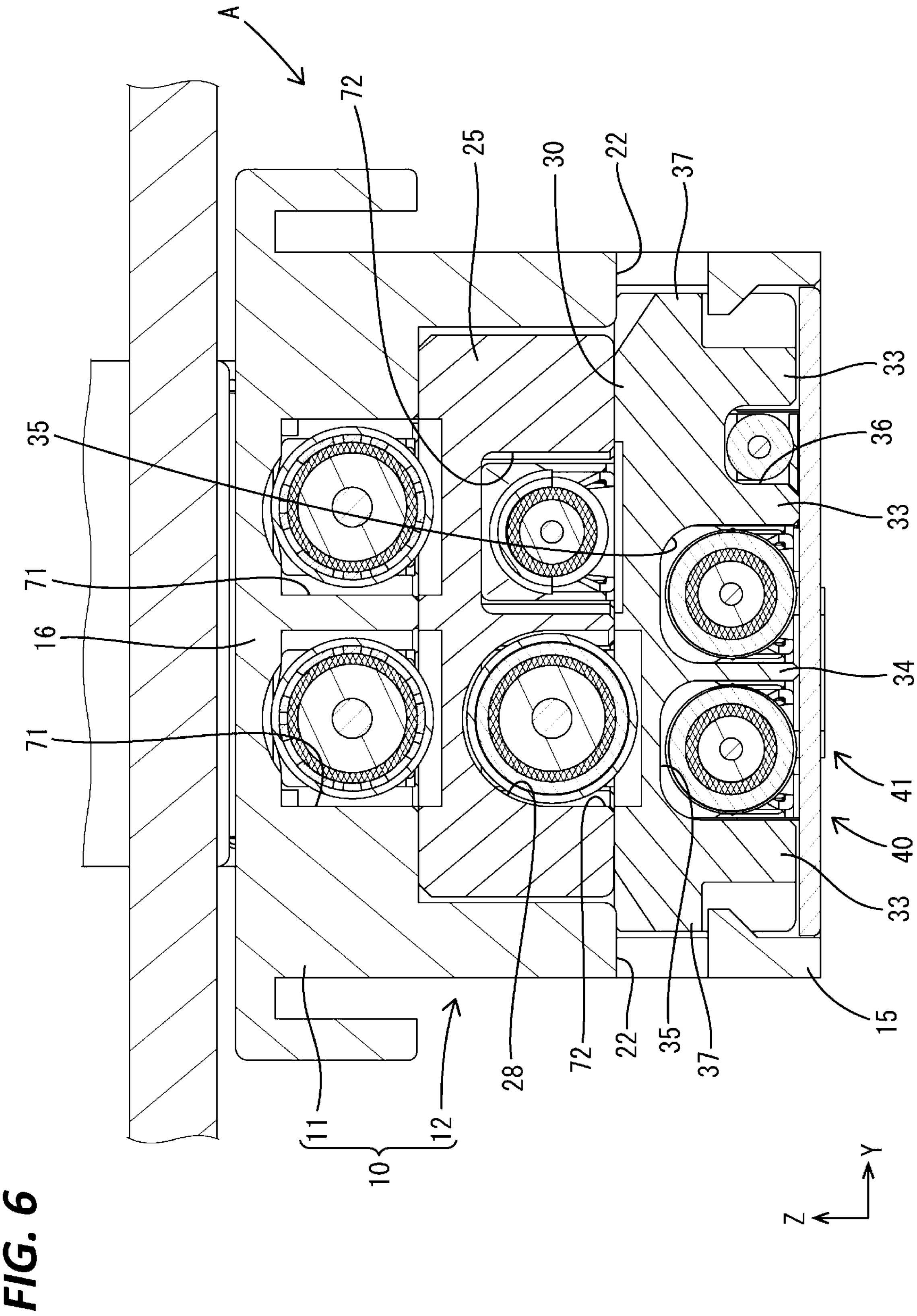
FIG. 6 is a rear cross-sectional view of an engagement structure between a lower member and the outer housing.
Figure 7:
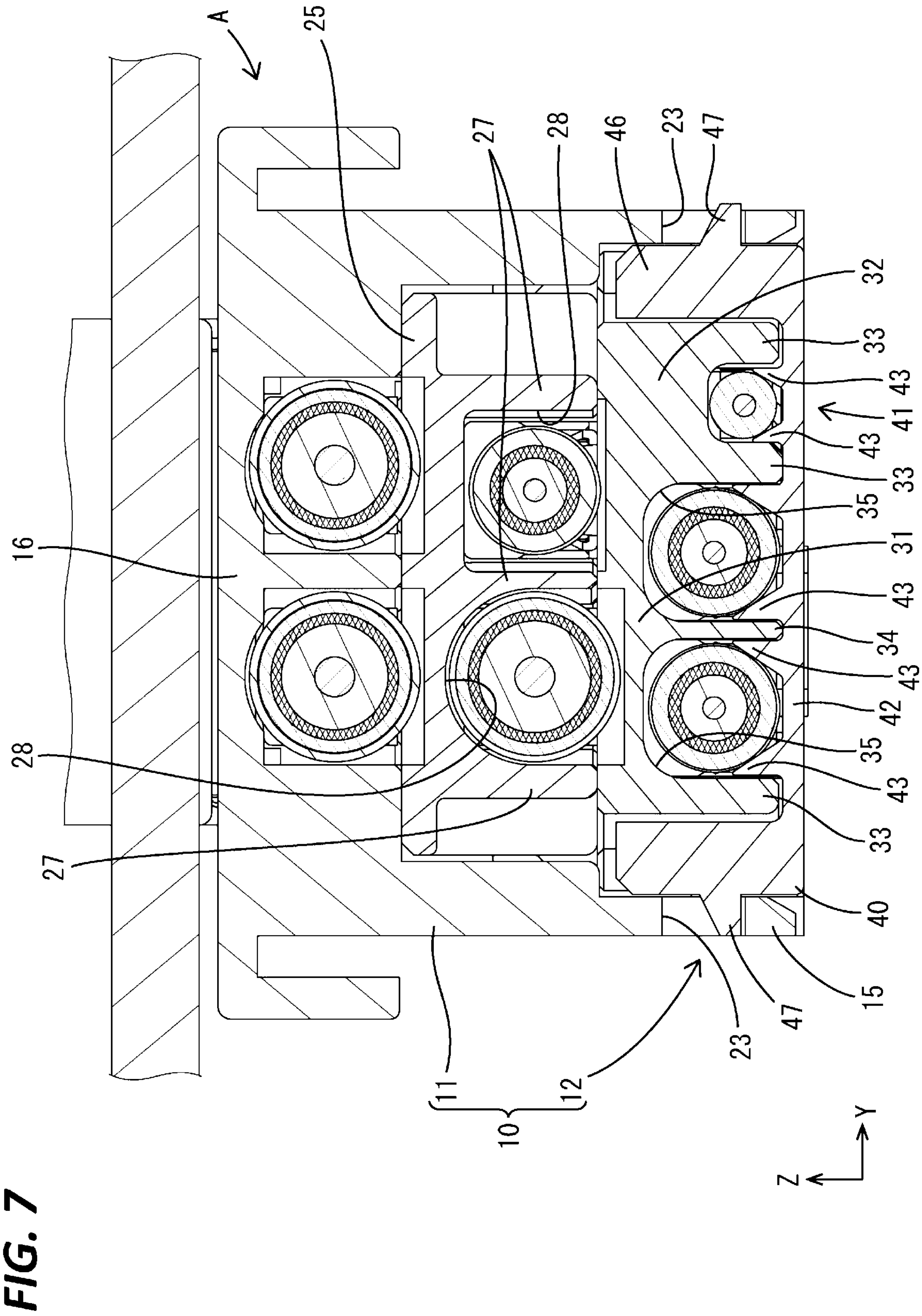
FIG. 7 is a rear cross-sectional view of an engagement structure between a cover and the outer housing.

As shown in FIG. 5, the central portion of the upper wall part 14 in the width direction functions as a plate-like first base part 16 of which the thickness direction is oriented in the vertical direction. The upper wall part 14 has three first side wall parts 17 that are aligned in the width direction and of which the plate thickness direction is oriented in the width direction. The three first side wall parts 17 are shaped so as to protrude downward from the central position of the first base part 16 in the width direction and two end edges of the first base part 16 in the width direction. The pair of first side wall parts 17 positioned on the two sides in the width direction are connected to the inner side surfaces of the outer wall parts 15 to form a pair of first step parts 18. A portion of the first base part 16 and two first side wall parts 17 adjacent to each other in the horizontal direction constitute one first holding part 19. The frame part 13 has one pair of first holding parts 19 that are aligned in the horizontal direction while sharing the one first side wall part 17 positioned at the center in the width direction of the first base part 16.

Second step parts 20 are formed at central portions of the inner side surfaces of the outer wall parts 15 in the height direction. As shown in FIG. 5, the second step parts 20 are located below the first step parts 18 and are recessed toward the outer wall parts 15 relative to the first step parts 18. The left and right outer wall parts 15 each have a first lock hole 21 (see FIGS. 2 and 5), a second lock hole 22 (see FIGS. 2 and 6), and a third lock hole 23 (see FIGS. 2 and 7).

Figure 4:
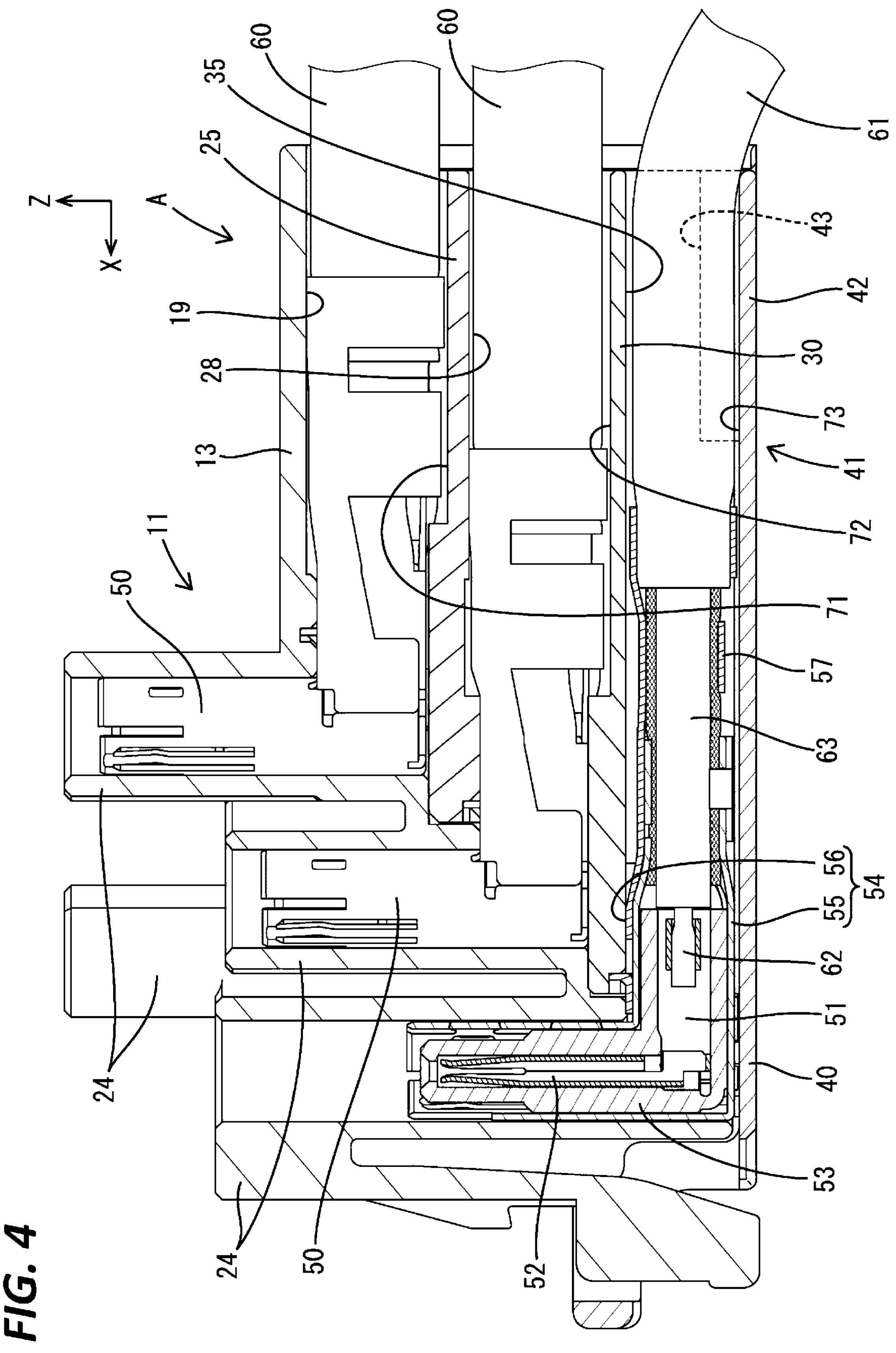
FIG. 4 is a lateral cross-sectional view of the connector.

The plurality of tubular fitting parts 24 each have a tubular shape with an axial line oriented in the vertical direction. The plurality of tubular fitting parts 24 are arranged in the front-back direction and the horizontal direction. As shown in FIG. 4, the lower end portion of the inner space of each tubular fitting part 24 is in communication with the inner space of the frame part 13. The plurality of tubular fitting parts 24 are fitted into the counterpart housing H of the counterpart connector B from below.

The inter housing 12 is made of a synthetic resin and is formed by vertically stacking and combining an upper member 25, a lower member 30, and a cover 40 as shown in FIGS. 2 and 4 to 7. The inter housing 12 is attached to the outer housing 11 in a state of being housed in the frame part 13.

The upper member 25 is a single component that has one plate-like second base part 26 of which the thickness direction is oriented in the vertical direction and three second side wall parts 27. The three second side wall parts 27 are spaced apart in the horizontal direction and of which the thickness direction is oriented in the horizontal direction. The three second side wall parts 27 protrude downward from the central position in the width direction and two end positions of the second base part 26 in the width direction. A portion of the second base part 26 and two second side wall parts 27 adjacent to each other in the horizontal direction constitute one second holding part 28. The upper member 25 has one pair of second holding parts 28 aligned in the horizontal direction while sharing one second side wall part 27. A pair of upper lock protrusions 29 are formed on the left and right outer surfaces of the upper member 25.

The lower member 30 is a single component that has one wide base part 31, one narrow base part 32 that is narrower than the wide base part 31, three thick side wall parts 33, and one thin side wall part 34. The wide base part 31 and the narrow base part 32 have a plate shape of which the thickness direction is oriented in the vertical direction. In the width direction, the wide base part 31 is formed in a range spanning from the left end of the lower member 30 to a position rightward of the center of the lower member 30 in the width direction. The narrow base part 32 is formed in a range spanning from the right end of the wide base part 31 to the right end of the lower member 30. The narrow base part 32 is disposed at a lower position than the wide base part 31.

The three thick side wall parts 33 and the one thin side wall part 34 have a plate shape of which the thickness direction is oriented in the horizontal direction, and are spaced apart in the horizontal direction. The thin side wall part 34 is arranged between the thick side wall part 33 at the left end and the thick side wall part 33 at the centre in the horizontal direction. The three thick side wall parts 33 protrude downward from two end positions of the wide base part 31 in the width direction and the right end position of the narrow base part 32. The thin side wall part 34 protrudes downward from the central position of the wide base part 31 in the width direction. The wide base part 31 is a part that is disposed in an area between the thick side wall part 33 at the left end and the central thick side wall part 33 in the horizontal direction. The narrow base part 32 is a part that is disposed in an area between the central thick side wall part 33 in the horizontal direction and the thick side wall part 33 at the right end.

As shown in FIGS. 5 to 9, a portion of the wide base part 31, one thick side wall part 33, and the thin side wall part 34 protruding from the wide base part 31 constitute one wide holding part 35. The lower member 30 has one pair of wide holding parts 35 that are aligned in the horizontal direction while sharing the one thin side wall part 34. The narrow base part 32, the thick side wall part 33 protruding from the right end of the wide base part 31, and the thick side wall part 33 protruding from the right end of the narrow base part 32 constitute one narrow holding part 36. The wide holding part 35 on the right side and the narrow holding part 36 are aligned in the horizontal direction while sharing the thick side wall part 33 on the right side. A pair of lower lock protrusions 37 are formed on the left and right outer side surfaces of the lower member 30.

The cover 40 is a single component that has a lid part 41 and a pair of left and right lock engagement walls 46. The lid part 41 is a part that is constituted by one plate-like covering part 42 and three pairs of elastic pressure-receiving parts 43 protruding upward from the plate-like covering part 42. The plate-like covering part 42 has a flat plate shape of which the thickness direction is oriented in the vertical direction. The formation area of the plate-like covering part 42 in the width direction extends across the full width of an area spanning from the left end to the right end of the cover 40. The pair of lock engagement walls 46 have a plate-like shape that extends upward from the left and right side edges of the plate-like covering part 42. A cover lock protrusion 47 is formed on the outer surfaces of both of the lock engagement walls 46.

Figure 8:
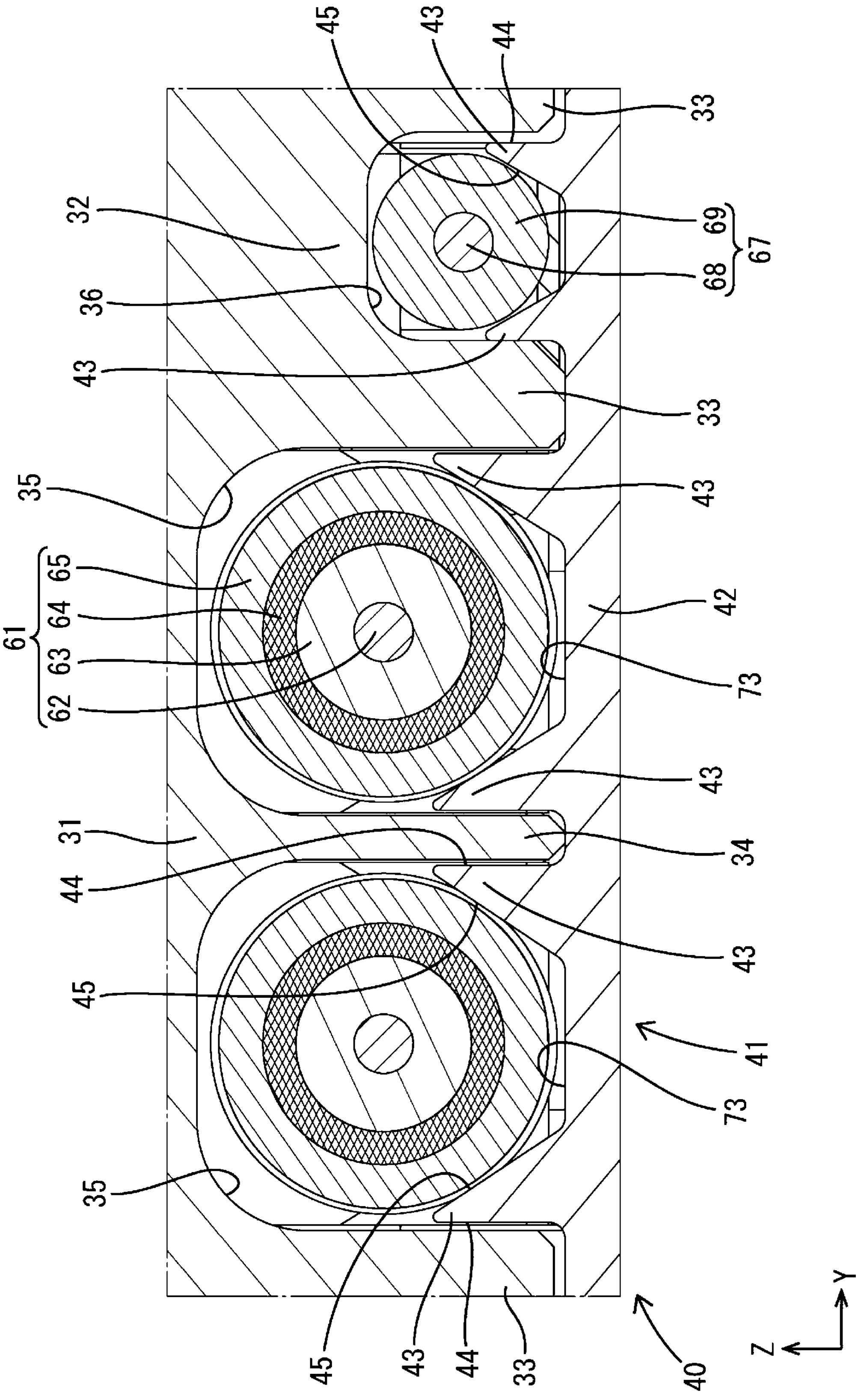
FIG. 8 is a partial enlarged rear cross-sectional view illustrating a state where no pressing forces of small-diameter shielded electric wires act on the cover.
Figure 9:
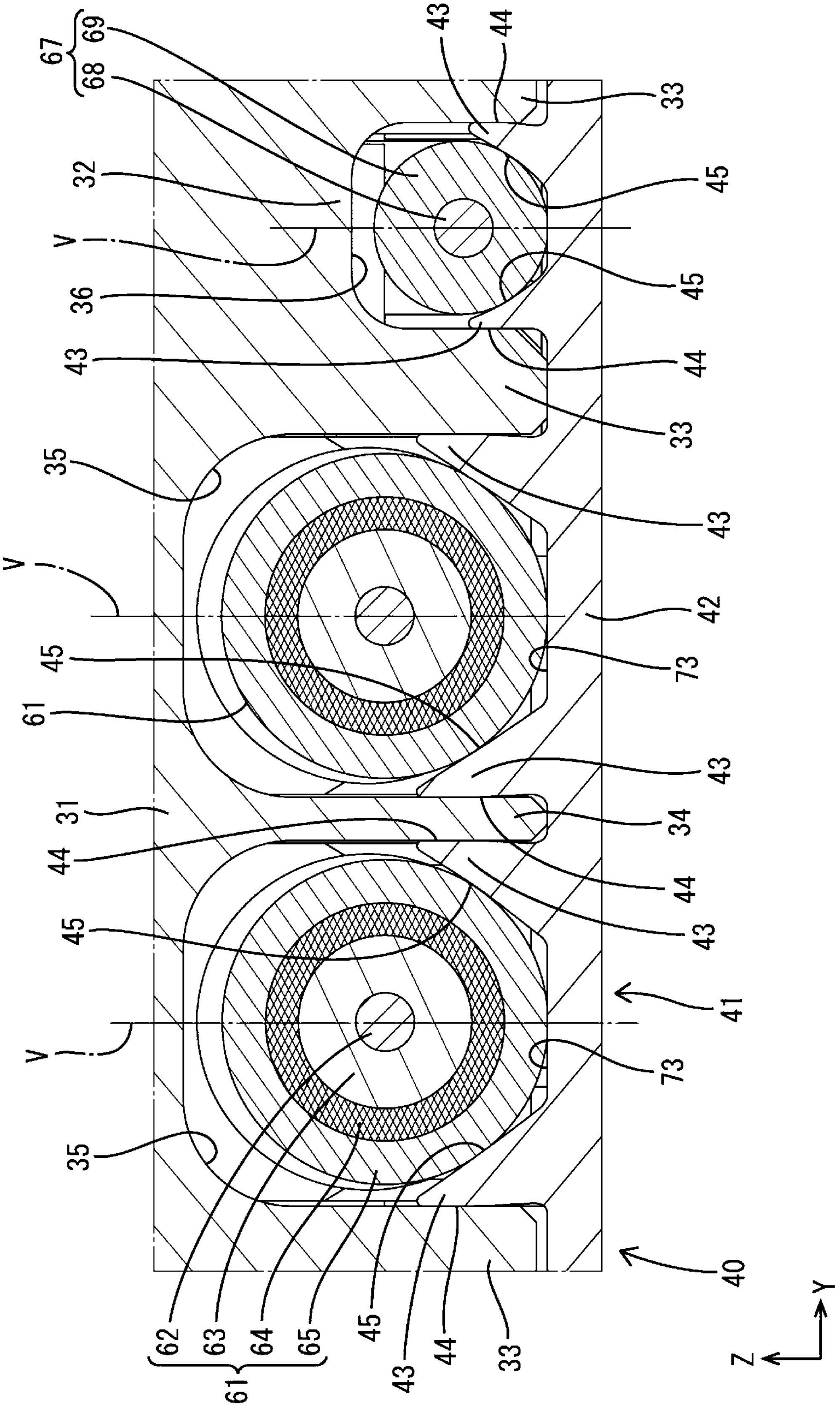
FIG. 9 is a partial enlarged rear cross-sectional view illustrating a state where the pressing forces of the small-diameter shielded electric wires act on the cover.

As shown in FIG. 2, the elastic pressure-receiving parts 43 have a rib shape elongated in the front-back direction and are arranged at the rear end portion of the cover 40. The rear end surfaces of the elastic pressure-receiving parts 43 and the rear end surface of the cover 40 are connected flush with each other. As shown in FIGS. 8 and 9, in a rear view of the housing 10 as seen from the rear side, the shape of the elastic pressure-receiving parts 43 is a right-angle triangle, that is, a wedge shape that gradually tapers in the direction of protrusion from the plate-like covering part 42. The elastic pressure-receiving parts 43 each have a friction surface 44 and a pressure-receiving surface 45. The friction surface 44 is a vertical flat surface, that is, a flat surface that is parallel to the thickness direction of the plate-like covering part 42. The pressure-receiving surface 45 is a flat surface that is inclined with respect to the vertical direction, that is, an inclined flat surface that extends in a direction inclined relative to the thickness direction of the plate-like covering part 42. Under a pressing force acting in the downward direction with respect to the pressure-receiving surface 45 (in a direction inclined relative to the pressure-receiving surface 45), the elastic pressure-receiving parts 43 are elastically deformed so as to collapse toward the corresponding friction surface 44. Since the elastic pressure-receiving parts 43 have a wedge shape that is tapered upward, the amount of elastic deformation of the elastic pressure-receiving parts 43 is largest at the upper end, and decreases with increasing proximity to the lower end. Almost no elastic deformation occurs at the lower end portions of the elastic pressure-receiving parts 43.

A pair of elastic pressure-receiving parts 43 are housed in each of the wide holding parts 35. A pair of elastic pressure-receiving parts 43 are housed in the narrow holding part 36. Two pairs of elastic pressure-receiving parts 43 are in a positional relationship where they are spaced apart in the width direction. In a rear view, each pair of elastic pressure-receiving parts 43 are shaped so as to be bilaterally symmetrical with respect to a virtual axis of symmetry V (see FIG. 9) that is parallel to the thickness direction of the plate-like covering part 42. The pair of elastic pressure-receiving parts 43 are arranged with the pressure-receiving surfaces 45 opposing each other in the width direction. The three pairs of elastic pressure-receiving parts 43 are aligned in the width direction.

As shown in FIGS. 3 and 4, the plurality of shielded terminals 50 and 51 are bent in an L shape in a side view of the shielded terminals 50 and 51 as seen from a lateral side. The plurality of shielded terminals 50 and 51 include three large-diameter shielded terminals 50 and three small-diameter shielded terminals 51. The shielded terminals 50 and 51 each have an inner conductor 52 that is bent in an L shape, a dielectric body 53 that houses the inner conductor 52, and an outer conductor 54 that surrounds the dielectric body 53. The outer conductor 54 is formed by combining a first L-shaped shell 55 and a second shell 56 having a crimp part 57.

Each of the large-diameter shielded terminals 50 are connected in a conductible manner to the front end portion of a large-diameter electric wire 60 formed by a coaxial cable. Each of the small-diameter shielded terminals 51 are connected in a conductible manner to the front end portion of a small-diameter shielded electric wire 61 formed by a coaxial cable. The large-diameter electric wires 60 and the small-diameter shielded electric wires 61 each have a core wire 62, an insulation coating 63 that surrounds the core wire 62, a shield layer 64 that surrounds the insulation coating 63, and a sheath 65 that surrounds the shield layer 64. The rear end portion of the inner conductor 52 is firmly fixed to the core wire 62. The crimp part 57 of the outer conductor 54 is firmly fixed to the shield layer 64 in a conductible manner.

As shown in FIG. 3, the unshielded terminal 66 is bent in an L shape in a side view of the unshielded terminal 66 as seen from a lateral side. The unshielded terminal 66 is connected in a conductible manner to the front end portion of a coated electric wire 67 that does not have a shielding function. As shown in FIGS. 8 and 9, the coated electric wire 67 has a core wire 68 and an insulation coating 69 that surrounds the core wire 68.

A procedure for assembling the connector A of the first example will be described. First, two large-diameter shielded terminals 50 are attached to the outer housing 11 to which the inter housing 12 has not yet been attached. At this time, the upward-facing front end portions of the large-diameter shielded terminals 50 are housed in the corresponding tubular fitting parts 24, and the portions of the large-diameter shielded terminals 50 surrounded by the second shells 56 are housed in the corresponding first holding parts 19.

Next, the upper member 25 is attached to the frame part 13 from below the outer housing 11. The upper member 25 is locked in the attached state by bringing the left and right end portions of the second base part 26 into abutment with the first step parts 18 and engaging the upper lock protrusions 29 with the first lock holes 21. When the upper member 25 is attached to the outer housing 11, the second base part 26 closes the openings in the lower surfaces of the first holding parts 19 to form the pair of left and right first terminal housing parts 71 (see FIGS. 4 and 6). The large-diameter shielded terminals 50 and the front end portions of the large-diameter electric wires 60 are housed in the first terminal housing parts 71. The large-diameter electric wires 60 are drawn out rearward to the outside from the rear surface of the housing 10.

Next, one large-diameter shielded terminal 50 and one small-diameter shielded terminal 51 are attached to the outer housing 11 and the upper member 25. At this time, the upward-facing front end portions of the shielded terminals 50 and 51 are housed in the corresponding tubular fitting parts 24, and the portions of the shielded terminals 50 and 51 surrounded by the second shells 56 are housed in the second holding parts 28.

Next, the lower member 30 is attached to the frame part 13 from under the outer housing 11. The lower member 30 is locked in the assembled state by bringing the left end portion of the wide base part 31 and the right end portion of the narrow base part 32 into abutment with the second step parts 20 and engaging the lower lock protrusions 37 with the second lock holes 22. When the lower member 30 is attached the outer housing 11, the wide base part 31 closes the openings in the lower surfaces of the second holding parts 28 to form a pair of left and right second terminal housing parts 72 (see FIGS. 4 and 6). The large-diameter shielded terminal 50 and the front end portion of the large-diameter electric wire 60 are housed in one second terminal housing part 72. The large-diameter electric wire 60 is drawn out rearward to the outside from the rear surface of the housing 10. The small-diameter shielded terminal 51 and the front end portion of the small-diameter shielded electric wire 61 are housed in the other second terminal housing part 72. The small-diameter shielded electric wire 61 is drawn out rearward to the outside from the rear surface of the housing 10.

Next, two small-diameter shielded terminals 51 and one unshielded terminal 66 are attached to the outer housing 11 and the lower member 30. At this time, the upward-facing front end portions of the small-diameter shielded terminals 51 and the unshielded terminal 66 are housed in the corresponding tubular fitting parts 24. The portions of the small-diameter shielded terminals 51 surrounded by the second shells 56 are housed in the corresponding wide holding parts 35. The unshielded terminal 66 is housed in the narrow holding part 36.

Next, the cover 40 is attached to the outer housing 11 from below and the openings in the lower surface of the frame part 13 are closed by the plate-like covering part 42 of the cover 40. The assembled cover 40 is locked in the state of being assembled to the outer housing 11 by bringing the cover 40 into abutment with the lower surface of the lower member 30 and engaging the cover lock protrusions 47 with the third lock holes 23. When the cover 40 is attached to the outer housing 11, the assembly of the connector A is complete.

When the cover 40 is attached to the outer housing 11, the plate-like covering part 42 closes the openings in the lower surfaces of the wide holding parts 35 to form a pair of left and right wide terminal housing parts 73 (see FIGS. 8 and 9). The small-diameter shielded terminals 51 and the front end portions of the small-diameter shielded electric wires 61 are housed in the wide terminal housing parts 73. The small-diameter shielded electric wires 61 are drawn out rearward to the outside from the rear surface of the housing 10. The plate-like covering part 42 closes the opening in the lower surface of the narrow holding part 36 to form the narrow terminal housing part 74 (see FIGS. 4 and 6). The unshielded terminal 66 and the front end portion of the coated electric wire 67 are housed in the narrow terminal housing part 74. The coated electric wire 67 is drawn out rearward to the outside from the rear surface of the housing 10.

In a state where the cover 40 is attached to the outer housing 11, one pair of elastic pressure-receiving parts 43 are housed in each of the two wide holding parts 35 and the one narrow holding part 36. In each of the two wide holding parts 35, one elastic pressure-receiving part 43 is arranged along the thick side wall part 33 and the other elastic pressure-receiving part 43 is arranged along the thin side wall part 34. In a state where the portions of the small-diameter shielded electric wires 61 housed in the wide holding parts 35 and the portions of the small-diameter shielded electric wires 61 drawn out rearward to the outside of the housing 10 form a straight line without a curve, the small-diameter shielded electric wires 61 and the elastic pressure-receiving parts 43 are not in contact with each other and are in a positional relationship with a clearance therebetween as shown in FIG. 8. Accordingly, the elastic pressure-receiving parts 43 are not elastically deformed. The small-diameter shielded electric wires 61 and the plate-like covering part 42 are not in contact with each other and are in a positional relationship with a clearance therebetween. When the elastic pressure-receiving parts 43 are in a free state without elastic deformation, the friction surfaces 44 of the elastic pressure-receiving parts 43 maintain a positional relationship in which the friction surfaces 44 of the elastic pressure-receiving parts 43 oppose the thick side wall parts 33 and the thin side wall part 34 in the width direction with a slight clearance therebetween.

In the narrow holding part 36, the pair of elastic pressure-receiving parts 43 are arranged along the thick side wall parts 33. In a state where the portion of the coated electric wire 67 housed in the narrow holding part 36 and the portion of the coated electric wire 67 drawn out rearward to the outside of the housing 10 form a linear shape without a curve, the coated electric wire 67 and the elastic pressure-receiving parts 43 are in a non-contact positional relationship with a clearance therebetween. Accordingly, the elastic pressure-receiving parts 43 are not elastically deformed. The coated electric wire 67 and the plate-like covering part 42 are not in contact with each other and are in a positional relationship with a clearance therebetween. When the elastic pressure-receiving parts 43 are in a free state without elastic deformation, the friction surfaces 44 of the elastic pressure-receiving parts 43 maintain a positional relationship in which the friction surfaces 44 of the elastic pressure-receiving parts 43 oppose the thick side wall parts 33 in the width direction with a slight clearance therebetween.

As shown in FIG. 4, when the small-diameter shielded electric wires 61 drawn out from the wide terminal housing parts 73 are pulled downward and curved, the small-diameter shielded electric wires 61 come into contact with the pressure-receiving surfaces 45 of the left and right elastic pressure-receiving parts 43 as shown in FIG. 9. When the small-diameter shielded electric wires 61 are further displaced downward from this state, the downward pressing force of the small-diameter shielded electric wires 61 act on the cover 40. In this example, since the pressure-receiving surfaces 45 are oriented inclined relative to the pressing direction of the pressing force, a portion of the downward pressing force of the small-diameter shielded electric wire 61 becomes a horizontal component force that acts on the elastic pressure-receiving parts 43. This component force causes the elastic pressure-receiving parts 43 to elastically deform in the width direction. In a state where the elastic pressure-receiving parts 43 are elastically deformed, the small-diameter shielded electric wires 61 do not come into contact the upper surface of the plate-like covering part 42. Accordingly, the stress exerted on the lid part 41 does not concentrate on the plate-like covering part 42 but is distributed to the elastic pressure-receiving parts 43.

When the elastic pressure-receiving parts 43 are elastically deformed in the width direction, the friction surfaces 44 are pressed against the thick side wall parts 33 and the thin side wall part 34. This may generate friction resistance between the friction surface 44 and the thick side wall part 33 and between the friction surface 44 and the thin side wall part 34. Since this friction resistance is a force that resists the downward pressing force of the small-diameter shielded electric wire 61 acting on the lid part 41, it is possible to suppress the plate-like covering part 42 from being elastically deformed so as to move downward or bulge downward. In a state where the friction surfaces 44 are pressed against the thick side wall parts 33 and the thin side wall part 34, the small-diameter shielded electric wires 61 do not come into contact with the upper surface of the plate-like covering part 42.

Since the thin side wall part 34 has less rigidity than the thick side wall parts 33 against the horizontal pressing force, there is a concern that the thin side wall part 34 may deform to escape under the pressing forces of the elastic pressure-receiving parts 43 in the width direction. However, the pair of elastic pressure-receiving parts 43 are provided on left and right sides of the thin side wall part 34 so as to sandwich the thin side wall part 34 therebetween. If the two small-diameter shielded electric wires 61 drawn out from the left and right wide holding parts 35 are bound together with the other electric wires 60 and 67, for example, the two small-diameter shielded electric wires 61 are displaced downward together. Therefore, the thin side wall part 34 is sandwiched and pressed in the horizonal direction by the pair of elastic pressure-receiving parts 43, and does not deform in the width direction.

When the coated electric wire 67 drawn out from the narrow terminal housing part 74 is pulled downward, as in the case of the small-diameter shielded electric wires 61, the downward pressing force of the coated electric wire 67 acts on the cover 40. A portion of the downward pressing force of the coated electric wire 67 becomes a horizontal component force that acts on the elastic pressure-receiving parts 43. Thus, the elastic pressure-receiving parts 43 elastically deform in the width direction. In the state where the elastic pressure-receiving parts 43 are elastically deformed, the coated electric wire 67 does not come into contact with the upper surface of the plate-like covering part 42. Accordingly, the stress exerted on the lid part 41 is distributed. When the elastic pressure-receiving parts 43 are elastically deformed in the width direction, the friction surfaces 44 are pressed against the thick side wall parts 33 to generate friction resistance between the friction surfaces 44 and the thick side wall parts 33. With this friction resistance, it is possible to suppress the plate-like covering part 42 from being elastically deformed so as to be displaced downward or bulge downward. In a state where the friction surfaces 44 are pressed against the thick side wall parts 33, the coated electric wire 67 does not come into contact with the upper surface of the plate-like covering part 42.

The connector A of the first example includes the small-diameter shielded terminals 51 connected to the front end portions of the small-diameter shielded electric wires 61, the unshielded terminal 66 connected to the front end portion of the coated electric wire 67, and the housing 10 having the wide terminal housing parts 73 and the narrow terminal housing part 74. In a state where the small-diameter shielded terminals 51 and the front end portions of the small-diameter shielded electric wires 61 are housed in the wide terminal housing parts 73, the small-diameter shielded electric wires 61 are drawn out from the rear surface of the housing 10 to the outside of the housing 10. In a state where the unshielded terminal 66 and the front end portion of the coated electric wire 67 are housed in the narrow terminal housing part 74, the coated electric wire 67 is drawn out from the rear surface of the housing 10 to the outside of the housing 10.

The wide terminal housing parts 73 each include a wide holding part 35 with a U-shaped cross section and the lid part 41 that is formed by a member that is separate from the wide holding part 35. The lid part 41 is attached to the wide holding parts 35. The narrow terminal housing part 74 includes a narrow holding part 36 with a U-shaped cross section and the lid part 41 that is formed by a member that is separate from the narrow holding part 36. The lid part 41 includes the plate-like covering part 42 and the elastic pressure-receiving parts 43. The lid part 41 is attached to the narrow holding part 36. The plate-like covering part 42 covers openings in the lower surfaces of the wide holding parts 35 and an opening in the lower surface of the narrow holding part 36. The elastic pressure-receiving parts 43 protrude from the plate-like covering part 42 into the wide terminal housing parts 73 and into the narrow terminal housing part 74, and are capable of elastic deformation under pressing forces of the small-diameter shielded electric wires 61 and the pressing force of the coated electric wire 67.

According to the foregoing configuration, when the small-diameter shielded electric wires 61 in the wide holding parts 35 are displaced toward the lid part 41, the elastic pressure-receiving parts 43 elastically deform under the pressing forces of the small-diameter shielded electric wires 61, so that the stress exerted on the lid part 41 is distributed into the plate-like covering part 42 and the elastic pressure-receiving parts 43. When the coated electric wire 67 in the narrow holding part 36 is displaced, the elastic pressure-receiving parts 43 elastically deform under the pressing force of the coated electric wire 67, so that the stress exerted on the lid part 41 is distributed into the plate-like covering part 42 and the elastic pressure-receiving parts 43. Accordingly, it is possible to suppress the concentration of stress on the lid part 41 caused by the pressing forces of the small-diameter shielded electric wires 61 and the coated electric wire 67. If stress is concentrated on a specific portion of the lid part 41, the amount of elastic deformation of the portion increases, and thus the cover lock protrusions 47 of the lid part 41 may come loose from the third lock holes 23 in the outer housing 11. At this time, since the pressing forces of the small-diameter shielded electric wires 61 are exerted on the lid part 41, there is a concern that the lid part 41 will separate from the wide holding parts 35 and the narrow holding part 36. As a countermeasure against this, the stress exerted on the lid part 41 is distributed to suppress the maximum amount of deformation of the lid part 41. Accordingly, the lid part 41 is kept in a state of being attached to the wide holding parts 35 and the narrow holding part 36. Therefore, according to the first example, it is possible to prevent the cover 40 from separating from the outer housing 11 (the wide holding parts 35 and the narrow holding part 36) due to downward pressing forces of the small-diameter shielded electric wires 61 acting on the lid part 41.

The wide holding parts 35 each include the wide base part 31 that opposes the plate-like covering part 42 and a pair of side wall parts (the thick side wall part 33 and the narrow wall part 34) that extend from two side edges of the wide base part 31 toward the plate-like covering part 42. The elastic pressure-receiving parts 43 are arranged along the thick side wall parts 33 and the thin side wall part 34. When the elastic pressure-receiving parts 43 elastically deform under the pressing forces of the small-diameter shielded electric wires 61, the elastic pressure-receiving parts 43 are pressed against the thick side wall parts 33 or the thin side wall part 34. When the pressing forces of the small-diameter shielded electric wires 61 act on the elastic pressure-receiving parts 43, the lid part 41 is pressed in a direction away from the wide base part 31. However, the friction resistance generated between the elastic pressure-receiving parts 43 and the thick side wall parts 33 and the thin side wall part 34 prevents the lid part 41 from being displaced in the direction away from the wide base part 31.

The holding part 36 includes the narrow base part 32 that opposes the plate-like covering part 42 and a pair of thick side wall parts 33 extending from two side edges of the narrow base part 32 toward the plate-like covering part 42. The elastic pressure-receiving parts 43 are arranged along the thick side wall parts 33. When the elastic pressure-receiving parts 43 elastically deform under the pressing force of the coated electric wire 67, the elastic pressure-receiving parts 43 are pressed against the thick side wall parts 33. When the pressing force of the electric wire 67 acts on the elastic pressure-receiving parts 43, the lid part 41 is pressed in the direction away from the narrow base part 32. However, the friction resistance generated between the elastic pressure-receiving parts 43 and the thick side wall parts 33 prevents the lid part 41 from being displaced in the direction away from the narrow base part 32.

The pressure-receiving surfaces 45, which are the areas of the elastic pressure-receiving parts 43 with which the small-diameter shielded electric wires 61 and the coated electric wire 67 come into contact, are formed by inclined surfaces that are inclined relative to the vertical direction that is orthogonal to the plate-like covering part 42. According to this configuration, when the small-diameter shielded electric wires 61 or the coated electric wire 67 is displaced in the downward direction orthogonal to the plate-like covering part 42 and presses the pressure-receiving surfaces 45, a portion of the pressing force of the small-diameter shielded electric wires 61 or the coated electric wire 67 acting on the elastic pressure-receiving parts 43 becomes a component force acting in the width direction toward the thick side wall parts 33 or the thin side wall part 34 due to the inclination of the pressure-receiving surfaces 45. In the course of displacement of the small-diameter shielded electric wires 61 or the coated electric wire 67, the elastic pressure-receiving parts 43 can be reliably pressed against the thick side wall parts 33 or the thin side wall part 34. As the amount of displacement of the small-diameter shielded electric wires 61 increases, the amount of elastic deformation of the elastic pressure-receiving parts 43 increases. However, once the amount of elastic deformation of the elastic pressure-receiving parts 43 has increased to a specific degree, the elastic pressure-receiving parts 43 abut against the thick side wall parts 33 and the thin side wall part 34, and thus the amount of elastic deformation of the elastic pressure-receiving parts 43 no longer increases. Accordingly, it is possible to suppress stress exerted on the elastic pressure-receiving parts 43.

In a state where the elastic pressure-receiving parts 43 are pressed against the thick side wall parts 33 or the thin side wall part 34, the small-diameter shielded electric wires 61 or the coated electric wire 67 is kept from coming into contact with the plate-like covering part 42. According to this configuration, since the pressing force of the small-diameter shielded electric wires 61 or the coated electric wire 67 does not directly act on the plate-like covering part 42, the stress exerted on the plate-like covering part 42 is reduced and the amount of elastic deformation of the plate-like covering part 42 is suppressed. Since the deformation of the plate-like covering part 42 is suppressed, the lid part 41 is unlikely to come loose from the wide holding parts 35 and the narrow holding part 36.

In a rear view of the housing 10 as seen from the rear side, each pair of elastic pressure-receiving parts 43 is provided so as to be symmetrical with respect to the virtual axis of symmetry V that is orthogonal to the plate-like covering part 42. In the course of displacement of the small-diameter shielded electric wires 61 in the direction toward the plate-like covering part 42, if the path of displacement of the small-diameter shielded electric wires 61 shifts toward one elastic pressure-receiving part 43 or a small-diameter shielded electric wire 61 become twisted, there is a concern that the load on the connection portion between the small-diameter shielded electric wire 61 and the crimp part 57 of the small-diameter shielded terminal 51 will increase. In the course of displacement of the coated electric wire 67 in the direction toward the plate-like covering part 42, if the path of displacement of the coated electric wire 67 shifts to one elastic pressure-receiving part 43 or the coated electric wire 67 becomes twisted, there is a concern that the load on the connection portion between the coated electric wire 67 and the unshielded terminal 66 will increase. As a measure against this, the pairs of elastic pressure-receiving parts 43 are shaped and disposed so as to be symmetrical with respect to the virtual axis of symmetry V to prevent the small-diameter shielded electric wires 61 and the coated electric wire 67 from approaching one elastic pressure-receiving part 43 or from becoming twisted. Accordingly, it is possible to suppress the generation of a load on the connection portion between the small-diameter shielded terminal 51 and the small-diameter shielded electric wire 61 and on the connection portion between the unshielded terminal 66 and the coated electric wire 67.

In a rear view of the housing 10 as seen from the rear side, the elastic pressure-receiving parts 43 have a wedge shape that is tapered toward the leading end thereof in the direction of protrusion from the plate-like covering part 42. According to this configuration, when the pressing forces of the small-diameter shielded electric wires 61 and the coated electric wire 67 act on the elastic pressure-receiving parts 43, the stress exerted on the elastic pressure-receiving parts 43 is not uniform. That is, of the stress exerted on the elastic pressure-receiving parts 43, the component force in a direction orthogonal to the protruding direction of the elastic pressure-receiving parts 43 (horizontal direction) is smaller on the leading end side (upper end portion side) in the protruding direction relative to a contact portion between the small-diameter shielded electric wire 61 or the coated electric wire 67 compared to the component force on the base end side (lower end portion side) in the protruding direction relative to the contact portion. Therefore, the stress exerted on the plate-like covering part 42 connected to the base end portions of the elastic pressure-receiving parts 43 in the protruding direction can also be suppressed to a small level, thereby preventing the lid part 41 from coming loose from the wide holding parts 35 and the narrow holding part 36 due to deformation of the plate-like covering part 42.

Other Embodiments

The shape of the elastic pressure-receiving parts may be a shape other than a wedge shape in a rear view of the housing as seen from the rear side.

The area of an elastic pressure-receiving part that comes into contact with the shielded electric wire is not limited to a flat inclined surface and may be a curved surface.

The elastic pressure-receiving parts are not limited to protruding from two end portions of the plate-like covering part in the width direction along a thick side wall part, but may protrude from the central portion of the plate-like covering part in the width direction toward the shielded electric wire or may have an arc shape so as to span between two end portions of the plate-like covering part in the width direction and bulge toward the shielded electric wire.

The pairs of elastic pressure-receiving parts protruding into one wide holding part and into one narrow holding part may be asymmetrical in a rear view.

Only one elastic pressure-receiving part may protrude into one wide holding part or one narrow holding part.

In the first example, the elastic pressure-receiving parts are formed only on the cover. Alternatively, the elastic pressure-receiving parts may be formed so as to face upward on the second base part of the lower member, and the large-diameter shielded electric wire and the small-diameter shielded electric wire housed in the second terminal housing parts (the second holding parts of the upper member) may come in contact with the elastic pressure-receiving parts. Otherwise, the elastic pressure-receiving parts may be formed so as to face upward on the first base part of the upper member, and the large-diameter shielded electric wires housed in the first terminal housing parts (the first holding parts of the outer housing) may come in contact with the elastic pressure-receiving parts.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector comprising:

a terminal metal fitting that is connected to a front end portion of an electric wire; and a housing including a terminal housing, wherein, in a state where the terminal metal fitting and the front end portion of the electric wire are housed in the terminal housing, the electric wire is drawn out from a rear surface of the housing to the outside of the housing, the terminal housing includes:

a holding portion with a U-shaped cross section; and a lid that is formed of a member separate from the holding portion, and the lid includes:

a plate-like cover that covers an opening in the holding portion; and an elastic pressure-receiving portion that protrudes from the plate-like cover into the terminal housing, and in a state where the lid is attached to the holding portion, the elastic pressure-receiving portion is elastically deformable under a pressing force of the electric wire such that the pressing force toward the lid is distributed between the plate-like cover and the elastic pressure-receiving portion.

2. The connector according to claim 1, wherein the holding portion includes:

a base portion that opposes the plate-like cover; and a pair of side wall portions that extend from two side edges of the base portion toward the plate-like cover, a plurality of the elastic pressure-receiving portions are respectively arranged along the side wall portions, and when the elastic pressure-receiving portions are elastically deformed under the pressing force of the electric wire, the elastic pressure-receiving portions are pressed against the side wall portions.

3. The connector according to claim 2, wherein an area of each of the elastic pressure-receiving portions that comes in contact with the electric wire is formed by an inclined surface that is inclined with respect to a direction that is orthogonal to the plate-like cover.

4. The connector according to claim 2, wherein, in a state where the elastic pressure-receiving portions are pressed against the side wall portions, the electric wire is kept in a state of non-contact with the plate-like cover.

5. The connector according to claim 1, wherein, in a rear view of the housing as seen from a rear side, the elastic pressure-receiving portion has a wedge shape that is tapered toward a leading end thereof in a direction of protrusion from the plate-like cover.

6. The connector according to claim 1, wherein, in a rear view of the housing as seen from a rear side, a pair of the elastic pressure-receiving portions are provided so as to be symmetrical with respect to a virtual axis of symmetry that is orthogonal to the plate-like cover.

7. A connector comprising:

a terminal metal fitting that is connected to a front end portion of an electric wire; and a housing including a terminal housing, wherein, in a state where the terminal metal fitting and the front end portion of the electric wire are housed in the terminal housing, the electric wire is drawn out from a rear surface of the housing to the outside of the housing, the terminal housing includes:

a holding portion with a U-shaped cross section; and a lid that is formed of a member separate from the holding portion, and the lid includes:

a plate-like cover that covers an opening in the holding portion; and an elastic pressure-receiving portion that protrudes from the plate-like cover into the terminal housing and is elastically deformable under a pressing force of the electric wire, the holding portion includes:

a base portion that opposes the plate-like cover; and a pair of side wall portions that extend from two side edges of the base portion toward the plate-like cover, a plurality of the elastic pressure-receiving portions are respectively arranged along the side wall portions, and when the elastic pressure-receiving portions are elastically deformed under the pressing force of the electric wire, the elastic pressure-receiving portions are pressed against the side wall portions.

8. The connector according to claim 7, wherein an area of each of the elastic pressure-receiving portions that comes in contact with the electric wire is formed by an inclined surface that is inclined with respect to a direction that is orthogonal to the plate-like cover.

9. The connector according to claim 7, wherein, in a state where the elastic pressure-receiving portions are pressed against the side wall portions, the electric wire is kept in a state of non-contact with the plate-like cover.

10. The connector according to claim 7, wherein, in a rear view of the housing as seen from a rear side, the elastic pressure-receiving portion has a wedge shape that is tapered toward a leading end thereof in a direction of protrusion from the plate-like cover.

11. The connector according to claim 7, wherein, in a rear view of the housing as seen from a rear side, a pair of the elastic pressure-receiving portions are provided so as to be symmetrical with respect to a virtual axis of symmetry that is orthogonal to the plate-like cover.

* * * * *